United States Patent [19]

Vilato et al.

[11] Patent Number: 5,206,089
[45] Date of Patent: Apr. 27, 1993

[54] PRODUCT WITH GLASS SUBSTRATE CARRYING A TRANSPARENT CONDUCTIVE LAYER CONTAINING ZINC AND INDIUM PROCESS FOR OBTAINING IT

[75] Inventors: Pablo Vilato; Dominique Bruneel, both of Paris; Bertrand Testulat, Sarcelles; Jean-Francois Oudard, Thiescourt; Jean-Michel Grimal, Poissy, all of France

[73] Assignee: Saint-Gobain Vitrage International c/o Saint-Gobain Recherche, Aubervilliers, France

[21] Appl. No.: 701,067

[22] Filed: May 16, 1991

[30] Foreign Application Priority Data

May 16, 1990 [FR] France .................................. 90 06097

[51] Int. Cl.$^5$ ............................................. B32B 18/00
[52] U.S. Cl. .................................... 428/426; 428/332; 428/334; 428/337; 428/423.1; 428/425.5; 428/425.6; 428/432; 428/688; 428/689; 428/697; 428/702; 428/701; 428/34; 65/60.5
[58] Field of Search ............ 428/332, 334, 337, 423.1, 428/425.5, 425.6, 425.9, 426, 432, 688, 689, 697, 702, 34, 701, 428, 432, 210; 65/60.5, 60.51, 60.52, 60.53; 52/788, 789; 219/203

[56] References Cited

U.S. PATENT DOCUMENTS

| | | | |
|---|---|---|---|
| 4,687,687 | 8/1987 | Terneu et al. | 428/34 |
| 4,849,252 | 7/1989 | Arfsten et al. | 427/108 |
| 4,948,677 | 8/1990 | Gillery | 428/432 |
| 4,965,121 | 10/1990 | Young et al. | 428/432 |
| 4,977,013 | 12/1990 | Ritchie et al. | 428/426 |

FOREIGN PATENT DOCUMENTS

| | | | |
|---|---|---|---|
| 131827 | 1/1985 | European Pat. Off. | |
| 0353141 | 1/1990 | European Pat. Off. | 428/432 |
| 2854213 | 7/1980 | Fed. Rep. of Germany . | |
| 2631330 | 11/1989 | France . | |

OTHER PUBLICATIONS

Patent Abstracts of Japan, vol. 12, No. 326 (C-525) 5 Sep., 1988 and JP-A-63 089 657.

*Primary Examiner*—Ellis P. Robinson
*Assistant Examiner*—Timothy M. Speer
*Attorney, Agent, or Firm*—Oblon, Spivak, McClelland, Maier & Neustadt

[57] ABSTRACT

The product consists of a glass substrate and a layer of transparent conductive material comprised primarily of mixed oxide of indium and zinc containing 10-34 at. % indium obtained by surface pyrolysis of powder of organic compounds of zinc and indium.

12 Claims, No Drawings

PRODUCT WITH GLASS SUBSTRATE CARRYING A TRANSPARENT CONDUCTIVE LAYER CONTAINING ZINC AND INDIUM PROCESS FOR OBTAINING IT

BACKGROUND OF THE INVENTION

1. Field of the Invention

The present invention concerns a product consisting of a glass substrate carrying a thin conductive layer of metal oxide specifically exhibiting properties of low emission, low resistance and transparency. The invention also concerns a process for manufacturing such a product, particularly a process of pyrolysis of powders of metal compounds.

2. Background of the Prior Art

Windows intended for buildings are advantageously comprised of clear silica-soda-calcium glass that has high energy and light transmission factors, e.g. close to 90% for a thickness of 4 mm. To improve user comfort, especially in winter, by reducing energy loss due to leakage of calories from inside the building to the outside, windows are formed by covering one side of a sheet of glass with a conductive layer of so-called low-emission metal oxide, which increases the window's rate of reflection in infrared.

Such a window covered with such a layer can be combined with another sheet of uncovered glass, thereby trapping an air space between them, to comprise an insulating double window.

The low emission of the conductive layer is essential with a low resistance of the layer. Thus, sheets of glass having this type of layer can also be used as heating windows, especially in the automobile field, to form windshields and rear windows.

Windows carrying transparent conductive coverings and exhibiting properties of low emission and low resistance are known. They can be comprised, for example, of a glass substrate and a thin layer of metal oxide, such as a layer of tin oxide doped, for example, with fluorine or a layer of indium oxide doped with tin (ITO).

These layers can be obtained by different processes, processes under vacuum (thermal evaporation, cathodic pulverization, possibly with magnetron) or by pyrolysis of metal compounds in the form of a solution, powder or vapor projected onto the heated substrate. In this case, the compounds, on contact with the glass substrate heated to a temperature that is high but less than the glass-softening temperature, decompose and oxidize to form the metal oxide.

The layers of tin oxide doped with fluorine and the layers of ITO are advantageously obtained by pyrolysis of powders.

The layers of tin oxide doped with fluorine can be manufactured from powdered dibutyl tin oxide and gaseous anhydrous hydrofluoric acid, as described in French patent 2 380 997, and from dibutyl tin difluoride (DBTF) possibly mixed with DBTO as described in document EP-A-178 956 or EP-A-039 256. The layers of ITO can be obtained, for example, from indium formate and a tin compound such as DBTO as described in document EP-A-192 009.

Thus, it has been possible to obtain, by pyrolysis of powders, conductive layers of tin oxide doped with fluorine that have a thickness of 180 nm and have, at ambient temperature, an emission of 0.35 and a resistance of $10.10^{-4}$ $\Omega$cm, approximately.

It has also been possible to manufacture, by pyrolysis of powders, layers of ITO with a thickness of 180 nm that have, at the ordinary temperature, emission of 0.11 and resistance of $2.10^{-4}$ $\Omega$.cm approximately.

Although these layers of tin oxide doped with fluorine exhibit worthwhile properties appropriate for certain uses, still other layers with lower emission are nevertheless being sought.

The layers of ITO have an emission lower than the emission of the layers of tin oxide doped with fluorine, but, to obtain this low emission, the layers of ITO must be submitted to a reducing thermal treatment, which increases the production cost of these layers.

Thus, we have sought to prepare products including a glass substrate carrying new conductive layers that are transparent and have, specifically, a low emission, possibly without necessitating any reducing thermal treatment.

SUMMARY OF THE INVENTION

The product, according to the invention, includes a glass substrate and a transparent conductive layer of metal oxide comprised primarily of a mixed oxide of zinc and indium containing 10–34 at.% of indium, values determined by electron microprobe analysis.

One process according to the invention for manufacturing such a product consists of projecting onto the glass substrate, brought to a temperature less than the glass-softening temperature, a suspension in a vector gas of a mixture of powders, thermally decomposable at the temperature of the substrate, formed of an organic compound of zinc in quantity 80% to 20% by weight and an organic compound of indium in quantity 20% to 80% by weight; the powders are pyrolyzed on contact with the substrate by forming a layer of mixed oxide of zinc and indium.

The layers obtained according to the invention are called here "layers of mixed oxide of zinc and indium" because it is believed that these layers are comprised essentially of ZnInO mixed phases, such as $Zn_2In_2O_5$, $Zn_5In_2O_8$, and/or $Zn_7In_2O_{10}$. The X-ray diffraction spectrums of these layers show that they are poorly crystallized. However, they include carriers of charges whose number and mobility are such that we can obtain conductive layers having resistances in the ranges of $10^{-3}10^{-4}$ $\Omega$.cm. Particularly, the layers that exhibit the least resistances contain about 20–32 at.% indium. These resistances are advantageously less than $10.10^{-4}$ $\Omega$.cm and particularly, less than $7.10^{-4}$ $\Omega$.cm approximately.

The products according to the invention, consisting of a glass substrate and such a layer, also exhibit light transmission of more than 70%.

These conductive layers of low resistance can be obtained, as indicated above, by a process of pyrolysis of powdered compounds of indium and zinc in contact with a substrate heated to a high temperature.

It was found that the atomic percentage of indium in the layer, and consequently, the resistance of these layers, depended on various factors, including the temperature of the substrate, the purity of the starting compounds and the granulometry of these compounds.

DETAILED DESCRIPTION OF THE INVENTION

According to the invention, in addition to the main components, which are the oxides of zinc and indium, it may be advantageous to introduce into the layer some tin oxide in low proportion. The presence of tin oxide is liable to promote the creation of "micro-areas" of ITO improving the performance of the layer.

In this method of realization, the tin content does not normally exceed 5% in atomic percentage in the final layer and is preferably less than 2%; contents over 5% do not result in any additional improvement.

The tin is introduced into the layer by the usual means. Particularly, in the powder pyrolysis techniques, DBTO is advantageously used. To attain the tin contents indicated above, the DBTO is introduced into the powder mixture in weight proportions that are not greater than about 10%.

The substrate, specifically made of glass, is heated to a temperature less than the softening temperature. Generally, it is heated to between 500° C. and 700° C. and preferably to between 600° C. and 650° C., at which temperatures conductive layers are obtained that have the lowest resistances, as will be shown in Example 1 and in Table I.

The substrate may be formed of a silica-soda-calcium glass used conventionally for automobile windows and windows for buildings. It may be a clear glass, i.e., uncolored, with high light transmission, e.g., greater than 90% under a thickness of 4 mm. It may also be a colored glass in its mass able to provide increased summer comfort for passengers of vehicles or premises equipped with such glass, due to its reduced energy transmission. In general, for automobile windows, for example, we choose glass, comprising the substrate, to respect the regulations, i.e., a glass and layer complex having a light transmission (TL) of at least 75% or 70% according to law.

As colored glass, we can use so-called "TSA" glass containing $Fe_2O_3$ in weight proportions on the order of 0.55% to 0.62%, FeO for about 0.19% to 0.16%, which leads to a $Fe^{2+}/Fe$ ratio on the order of 0.19% to 0.25%, CoO for less than 12 ppm and even preferably for less than 10 ppm.

This results in properties (e.g. for a thickness of 3.85 mm) of high light transmission ($T_L$) close to 78%, (illuminant D65), an energy transmission factor ($T_E$) relatively low and close to 60, which leads to a $T_L/T_E$ ratio on the order of 1.30.

As colored glass, we can also use, particularly when regulations require light transmission of just 70%, a glass somewhat more colored than the "TSA" but having a light transmission somewhat lower, to wit a "$TSA^{2+11}$" glass.

This "$TSA^{2+11}$" glass is colored by the same oxides as previously but in slightly different proportions.

Thus, the proportions of metal oxides are as follows:
$Fe_2O_3$ approximately between 0.75% and 0.90%
FeO: approximately between 0.15% and 0.22%, i.e. $Fe^{2+}/Fe=0.20$ approximately
CoO: less than 17 ppm and even preferably less than 10 ppm The result, for this "$TSA^{2+11}$" glass, 3.85 mm thick, is the following properties:
TL: on the order of 72%
$T_E$: on the order of 50%

This leads to a $T_L/T_E$ ratio on the order of 1.40 or 1.50. As organic compounds of zinc, decomposable at the temperature of the substrate, usable in the invention, examples include diethylzinc, zinc acetate and zinc acetylacetonate. As organic compounds of indium, indium acetylacetonate and indium formate are exemplary. We prefer to use zinc acetate and indium formate, which enable a high pyrolysis yield and the obtainment of layers having lower resistances.

Particularly, indium formate, suitable for the invention, is described in European patent applications EP-A-192 009 and EP-A324 664.

The compounds of indium and zinc used in the invention are advantageously at least 99% pure. Indeed, all other layer-formation conditions being identical, layers of lesser resistance can be obtained if the starting compounds were purer, as will be shown in Example 2.

The powdered organic compounds of indium and zinc, useful in the invention, may have virtually identical granulometry, for example they may have a $d_{90}$ less than 21 μm; however, to obtain layers with lesser resistance, we have found that it is preferable for the indium compounds to have a granulometry less than that of the zinc compounds. Thus, the powders of indium compounds have, preferably, a $d_{90}$ less than 21 μm and the decomposed powders of zinc have a $d_{90}$ greater than 70 μm. As is well known, the term "$d_{90}$" means that 90% of the particles have a diameter less than the indicated value. However, the powders must not be too fine so as not to decrease the pyrolysis yield, which depends on the quantity of compounds and their granulometry.

The conductive layers according to the invention are obtained from a mixture of these powders containing 20% to 80%, by weight, of indium compound. We noted that, with quantities of indium compound less than 20% and greater than 80%, it is not possible to obtain layers of mixed oxide of zinc and indium, and moreover, the resistances of these layers increase. Quantities of indium compounds, useful for obtaining layers with resistances less than $10.10^{-4}$ Ω.cm, are preferably from 35% to 70% in weight. The quantities of powders used are adjusted so that the aforementioned pyrolysis yield will be as high as possible.

To form, on a glass substrate, a conductive layer according to the invention, by pyrolysis of powders, we can use different known devices, such as those described in European patent applications EP-A-6 064, 125 153, 130 919, 188 962, 189 709, 191 258, 329 519.

In general, a distribution nozzle is used, situated above the hot glass substrate to be treated, particularly a moving glass ribbon such as undulated glass. The glass ribbon may move at a rate of 5 to 25 m/min. This nozzle includes a cavity extending over its entire length and ending with a slit. The cavity is supplied, homogeneously, over its entire length, with powder or with a mixture of powders, in suspension in a carrying gas. The powder leaves the slit of the nozzle and pyrolysis on the hot surface of the moving glass.

The following nonrestrictive examples illustrate the invention. In these examples, for the realization of layers according to the invention, we have used air as the vector gas. The substrate was made of undulated glass moving at a rate of 5 m/min. The layers cited in the examples have similar thicknesses (=400 nm), which makes it possible to compare the measures of emission and resistance.

The compounds are ground with the "Alpine 160 Z" grinder.

The resistance of the layers is measured by the equation $q=R_o x$ e where the resistance by squared $R_o$ is measured by the 4 point method and the thickness is measured by peaks of interference of the spectrum of reflection.

EXAMPLE 1

Conductive layers of mixed oxide of zinc and indium A to D are formed from zinc acetate and indium formate on substrates of undulated soda-calcium glass, heated to different temperatures, from 500° C. to 680° C.

For each temperature of the substrate, layers were formed from mixtures of powders containing increasing quantities of indium formate and the resistance of each layer was measured. Thus, for each case, the quantity of powders needed to obtain a layer having the lowest resistance for a given temperature was determined.

Table Ia shows the characteristics of the powders of zinc acetate and indium formate as well as their quantity necessary to obtain the lowest resistance. The zinc acetate and the indium formate are ground at the rate of 3,500 rpm to obtain powders having a similar granulometry (the $d_{90}$ is approximately 21 $\mu$m for the zinc acetate and approximately 15 $\mu$m for the indium formate); table Ib shows the characteristics of the layers (number of carriers of charge, mobility of carriers of charge, resistance).

The resistances have the same order of magnitude, however the smallest values are obtained at temperatures of 600° C. and 650° C. When the temperature of the substrate increases, a smaller quantity of indium formate is needed to obtain the layers that have the lowest resistances.

Tables Ia and Ib are given as appendixes.

EXAMPLE 2

A conductive layer E of mixed oxide of zinc and indium was formed from indium formate and zinc acetate, under the same conditions as layer B of example 1, but we used zinc acetate with a greater purity (99% instead of 98% for layer B).

Tables IIa and IIb show the characteristics of the powders and of layer B of Example 1 and layer E of Example 2.

By using purer zinc acetate, we obtain a layer E with lower resistance than that of layer B, obtained under the same conditions, but from zinc acetate only 98% pure.

Tables IIa and IIb are given as appendixes.

EXAMPLE 3

This example concerns the obtainment, at 600° C., of a conductive layer F according to the invention by modifying the granulometry of the zinc acetate, with 99% purity.

As for layer E, the indium formate is formed of powder, ground at the rate of 3,500 rpm to obtain a granulometry with $d_{90}$ of about 15 $\mu$m.

The zinc acetate is ground at the rate of 2,000 rpm to obtain a powder with $d_{90}$ of about 74 $\mu$m.

Tables IIIA and IIIB, given in appendix, indicate the characteristics of the powders and the characteristics of the layers obtained. The quantities of starting compounds, zinc acetate and indium formate, are those that give, for each type of grinding, the layers with the lowest resistances.

We can see that, by using 99% pure zinc acetate in the form of powder with grains larger than in the case of layer E, we obtain a layer with even better resistance.

EXAMPLE 4

This example concerns layers formed at 600° C., from 99% pure zinc acetate ground at 2,000 rpm to obtain a powder with $d_{90}$ of about 74 gm and indium formate with different granulometry for each layer.

Layer F (as in example 3) is formed from indium formate ground at 3,500 rpm. Layers G and H are formed from indium formate ground to obtain finer and finer powder (layer G, powder with $d_{90}$=about 11 $\mu$m and layer H, powder with $d_{90}$=about 8 $\mu$m).

Tables IVa and IVb, given in appendix, show the characteristics of the powders used and the characteristics of layers F, G and H obtained. The quantities of starting compounds are those that make it possible to obtain layers with the lowest resistances, for each type of grinding.

We see that we obtain the layer with the lowest resistance with indium formate in the finest powder and layers F, G and H were obtained with respective thicknesses of 420 nm, 360 nm and 385 nm.

The products obtained with these layers have a light transmission of 73%, 76% and 70%, respectively. At these thicknesses, layers F, G and H have, respectively, an emission of 0.18, 0.18 and 0.15, which make them particularly useful for forming low-emission windows.

EXAMPLE 5

A conductive layer was formed under the same conditions as layer F (Examples 3 and 4), but only 20%, by weight, of indium formate was used.

Under these conditions, we obtain a layer of mixed oxide of zinc and indium containing 10% to 11%, by weight, of atomic indium. We think that this atomic indium rate in the layer corresponds to the lower limiting value for obtaining a mixed oxide of zinc and indium. Such a layer has a resistance of 19 $\times 10^{-4}$ $\Omega$.cm and an emission of 0.35 for a thickness of 440 nm.

By increasing the quantity of indium formate to 45% by weight (layer F), thereby obtaining a better pyrolysis yield, given the granulometries of the powders (zinc acetate ground at 3,500 rpm and indium formate ground at 2,000 rpm), we can obtain a layer that contains a higher atomic indium percentage in the layer and lower resistance and emission.

EXAMPLE 6

In this example, a conductive layer (J) is formed on a glass substrate heated to 650° C., whose characteristics are indicated in Tables Va and Vb, given as appendixes.

If we compare this layer (J) with layer (F) from Example 4, which are both obtained from the same powders (zinc acetate ground at 2,000 rpm and indium formate ground at 3,500 rpm) but at different temperatures (650° C. and 600° C.), we can see that we obtain layers with similar resistances from different quantities of compounds, the percentage of indium formate for layer (J) formed at 650° C. being less than the percentage used in layer (F) formed at 600° C.

From the preceding examples, we see that the layers with the lowest resistances (4.4 $10^{-4}$ and 5.8$\times 10^{-4}$ $\Omega$.cm) are obtained for atomic indium percentages, by weight, of 28% to 31%.

EXAMPLE 7

A conductive layer (K) is prepared from a mixture of powders of zinc acetate, indium formate and DBTO.

The mixture is comprised of respective proportions, by weight, of 59.8% zinc acetate, 38.2% indium formate and 2% DBTO.

The granulometric distribution, for each component, is as follows, in micrometers:

|     | AcZn | InFo3 | DBTO |
| --- | --- | --- | --- |
| $d_{10}$ | 6.4 | 2.5 | 3.4 |
| $d_{50}$ | 36.1 | 4.9 | 10.4 |
| $d_{90}$ | 190 | 7.3 | 20.7 |

The pyrolysis is done at 600° C. and a layer of 520 nm is made. The window's emission is E=0.145 (light transmission greater than 70%) and the resistance is $5.4 \times 10^{-4}$ Ω.cm.

The layers described above have the resistances indicated without any thermal treatment in reductive atmosphere. It seems that such a treatment does not necessarily improve the resistance of the layers.

The products according to the invention are usable in any area where its optical and/or electrical properties are necessary, for example in buildings and automobiles, but also in special areas such as optical electronic devices such as photovoltaic cells and liquid crystal display devices.

Particularly, the products according to the invention are useful as heating windows, for example as automobile windshields such as described specifically in French patent applications 88 10138, 88 10139 and 88 10140 filed on Jul. 27, 1988 and French patent application 89 12170 filed on Sept. 19, 1989. Thus, they can be used to make laminated windows by being combined with a sheet of polymer, e.g. polyurethane. The products according to the invention can also be combined with a sheet of polymer such as polyvinylbutyral, vinyl polychloride or polyurethane and with another plate of glass, possibly identical, the sheet of polymer being inserted between the two plates of glass.

The current bus-bars can be made of metal inserts, e.g., copper and/or silver silk-screened strips, and are placed along the upper and lower edges of the window and in contact with the conductive layer.

The products according to the invention can also be used as low-emission windows, particularly for buildings, in which the glass substrate is 4 mm thick, for example. The products according to the invention are, for example, combined with another sheet of glass, trapping an air space between them to comprise an insulating double window. Conductive layers according to the invention particularly appropriate for these low-emission windows are those that contain approximately 20% to 32%, by weight, of atomic indium, for example layer G described above, which contains 31%, by weight, of atomic indium and has a resistance of $5.8 \cdot 10^{-4}$ Ω.cm and an emission of 0.18 for a thickness of 360 nm or layer H which contains 29%, by weight, of atomic indium and has a resistance of $4.4 \cdot 10^{-4}$ Ω.cm and an emission of 0.15 for a thickness of 380 nm.

The products according to the invention can also include an intermediary layer between the glass substrate and the conductive layer. This intermediary layer can be a layer of silica, silicon oxynitride, silicon oxycarbide or any other layer that constitutes a barrier layer to the sodium ions or which, due to its index of refraction and its thickness, comprises, together with the conductive layer, a neutrally colored whole.

Obviously, numerous modifications and variations of the present invention are possible in light of the above teachings. It is therefore to be understood that within the scope of the appended claims, the invention may be practiced otherwise than as specifically described herein.

TABLE Ia

| Layers | t (°C.) substrate | indium formate | | | | zinc acetate | | | |
| --- | --- | --- | --- | --- | --- | --- | --- | --- | --- |
| | | % purity | % weight | grinding rpm | granulometry | % purity | % weight | grinding rpm | granulometry |
| A | 500 | 99.99 | 85 | 3500 | $d_{10}$ 4 $d_{50}$ 8 $d_{90}$ 15 | 98 | 15 | 3500 | $d_{10}$ 3 $d_{50}$ 8 $d_{90}$ 21 |
| B | 600 | 99.99 | 70 | 3500 | id. | 98 | 30 | 3500 | id. |
| C | 650 | 99.99 | 65 | 3500 | id. | 98 | 35 | 3500 | id. |
| D | 680 | 99.99 | 50 | 3500 | id. | 98 | 50 | 3500 | id. |

TABLE Ib

| Layers | In % at. | ρ (Ω · cm) | N (cm$^{-3}$) | μ cm$^2$v$^{-1}$s$^{-1}$ |
| --- | --- | --- | --- | --- |
| A | 28 | $13 \times 10^{-4}$ | $0.92 \times 10^{20}$ | 49 |
| B | 26 | $11 \times 10^{-4}$ | $1.2 \times 10^{20}$ | 51 |
| C | 28 | $10 \times 10^{-4}$ | $1.4 \times 10^{20}$ | 45 |
| D | 29 | $\approx 12 \times 10^{-4}$ | $1.0 \times 10^{20}$ | $\approx 49$ |

TABLE IIa

| Layers | t (°C.) substrate | indium formate | | | | zinc acetate | | | |
| --- | --- | --- | --- | --- | --- | --- | --- | --- | --- |
| | | % purity | % weight | grinding rpm | granulometry | % purity | % weight | grinding rpm | granulometry |
| B | 600 | 99.99 | 70 | 3500 | $d_{10}$ 4 $d_{50}$ 8 $d_{90}$ 15 | 98 | 30 | 3500 | $d_{10}$ 3 $d_{50}$ 8 $d_{90}$ 21 |
| E | 600 | 99.99 | 70 | 3500 | id. | 99 | 30 | 3500 | id. |

TABLE IIb

| Layers | In % at. | ρ (Ω · cm) | N (cm$^{-3}$) | μ cm$^2$v$^{-1}$s$^{-1}$ |
| --- | --- | --- | --- | --- |
| B | 26 | $11 \times 10^{-4}$ | $1.2 \times 10^{20}$ | 51 |
| E | 29 | $6-7 \times 10^{-4}$ | $1.6 \times 10^{20}$ | 53 |

TABLE IIIa

| Layers | t (°C.) substrate | indium formate | | | | zinc acetate | | | |
| --- | --- | --- | --- | --- | --- | --- | --- | --- | --- |
| | | % purity | % weight | grinding rpm | granulometry | % purity | % weight | grinding rpm | granulometry |
| E | 600 | 99.99 | 70 | 3500 | $d_{10}$ 4 $d_{50}$ 8 $d_{90}$ 15 | 99 | 30 | 3500 | $d_{10}$ 3 $d_{50}$ 8 $d_{90}$ 21 |
| F | 600 | 99.99 | 45 | 3500 | id. | 99 | 55 | 2000 | $d_{10}$ 6 $d_{50}$ 25 |

TABLE IIIa-continued

| Layers | t (°C.) substrate | indium formate | | | | zinc acetate | | | |
| --- | --- | --- | --- | --- | --- | --- | --- | --- | --- |
| | | % purity | % weight | grinding rpm | granulometry | % purity | % weight | grinding rpm | granulometry |
| | | | | | | | | | $d_{90}$ 74 |

TABLE IIIb

| Layers | In % at. | $\rho$ ($\Omega \cdot cm$) | N ($cm^{-3}$) | $\mu\ cm^2v^{-1}s^{-1}$ |
| --- | --- | --- | --- | --- |
| E | 29 | $6-7 \times 10^{-4}$ | $1.6 \times 10^{20}$ | 53 |
| F | 28 | $5.8 \times 10^{-4}$ | $1.6 \times 10^{20}$ | 66 |

TABLE IVa

| Layers | t (°C.) substrate | indium formate | | | | zinc acetate | | | |
| --- | --- | --- | --- | --- | --- | --- | --- | --- | --- |
| | | % purity | % weight | grinding rpm | granulometry | % purity | % weight | grinding rpm | granulometry |
| F | 600 | 99.99 | 45 | 3500 | $d_{10}$ 4 $d_{50}$ 8 $d_{90}$ 15 | 99 | 55 | 2000 | $d_{10}$ 6 $d_{50}$ 25 $d_{90}$ 74 |
| G | 600 | 99.99 | 50 | 4500 | $d_{10}$ 3 $d_{50}$ 7 $d_{90}$ 11 | 99 | 50 | 2000 | id. |
| H | 600 | 99.99 | 55 | 4800 × 2 | $d_{10}$ 3 $d_{50}$ 6 $d_{90}$ 8 | 99 | 45 | 2000 | id. |

TABLE IVb

| Layers | In % at. | Thickness nm | $\rho$ ($\Omega \cdot cm$) | N ($cm^{-3}$) | $T_L D_{65}$ | $\mu\ cm^2v^{-1}s^{-1}$ | Emission |
| --- | --- | --- | --- | --- | --- | --- | --- |
| F | 28 | 420 | $5.8 \times 10^{-4}$ | $1.5 \times 10^{20}$ | 73% | 66 | 0.18 |
| G | 31 | 360 | $5.8 \times 10^{-4}$ | $1.3 \times 10^{20}$ | 76% | 76 | 0.18 |
| H | 29 | 380 | $4.4 \times 10^{-4}$ | $2.4 \times 10^{20}$ | 70% | 58 | 0.15 |

TABLE Va

| Layers | t (°C.) substrate | indium formate | | | | zinc acetate | | | |
| --- | --- | --- | --- | --- | --- | --- | --- | --- | --- |
| | | % purity | % weight | grinding rpm | granulometry | % purity | % weight | grinding rpm | granulometry |
| J | 650 | 99.99 | 35 | 3500 | $d_{10}$ 4 $d_{50}$ 8 $d_{90}$ 15 | 99 | 65 | 2000 | $d_{10}$ 4 $d_{50}$ 25 $d_{90}$ 74 |
| F | 600 | 99.99 | 45 | 3500 | id. | 99 | 55 | 2000 | id. |

TABLE Vb

| Layers | In % at. | $\rho$ ($\Omega \cdot cm$) | N ($cm^{-3}$) | $\mu\ cm^2v^{-1}s^{-1}$ | Emission | Thickness (nm) |
| --- | --- | --- | --- | --- | --- | --- |
| J | 22 | $6.3 \times 10^{-4}$ | $1.7 \times 10^{20}$ | 62 | 0.22 | 440 |
| F | 28 | $5.8 \times 10^{-4}$ | $1.6 \times 10^{20}$ | 66 | 0.18 | 420 |

What is claimed as new and desired to be secured by letters patent of the U.S. is:

1. A coated glass product, comprising a glass substrate and a transparent conductive layer of metal oxide thereon, wherein the layer is comprised of mixed oxide of zinc and indium containing 10-34 at. % of indium, values determined by electron microprobe analysis wherein said coated glass product exhibits a resistance of less than or equal to $10 \times 10^{-4}$ ohms/cm and an emissivity of less than 0.18 at a thickness of greater than 360 nm.

2. Product pursuant to claim 1, wherein the layer contains 20-32 at. % of indium.

3. Product of claim 2, wherein the layer contains 28-31% indium.

4. Product according to claim 1, wherein the layer of mixed oxide also contains tin oxide in an atomic proportion of no more than 5%.

5. Product pursuant to claim 1, wherein it has a light transmission greater than or equal to 70%, using illuminant D65.

6. Product pursuant to claim 1, characterized in that the substrate is a clear or colored soda-calcium glass.

7. Product pursuant to claim 2, wherein it has a light transmission of 76% and the conductive layer has a resistance of $5.8 \times 10^{-4}$ $\Omega$.cm and an emission of 0.18 for a thickness of 360 nm.

8. Product pursuant to claim 1, wherein it has a light transmission of 70% and the conductive layer has a resistance of $4.4 \times 10^{-4}$ $\Omega$.cm and an emission of 0.15 for a thickness of 385 nm.

9. An insulating low-emission double window comprising the product of claim 1 and another sheet of glass separated by an air space.

10. The window of claim 9, in which the glass substrate is 4 mm thick.

11. A laminated heating window comprising the product of claim 1 and a sheet of polyurethane polymer, adhering to the conductive layer of said product and means for current lead-in arranged in contact with the conductive layer and along upper and lower edges of the window.

12. A laminated heating window, comprising the product of claim 1 and a glass plate being separated by a sheet of polymer selected from the group consisting of polyvinylbutyral, vinyl polychloride and polyurethane and having means of current lead-in arranged in contact with the conductive layer and along upper and lower edges of the window.

* * * * *